United States Patent [19]

Palm et al.

[11] Patent Number: 6,140,040
[45] Date of Patent: Oct. 31, 2000

[54] METHOD OF MECHANICALLY SEPARATING MICROPARTICLES SUSPENDED IN FLUIDS USING PARTICULATE MEDIA

[75] Inventors: Scott K. Palm, Santa Maria; Timothy R. Smith, Lompoc; Jerome C. Shiuh, Lompoc; John S. Roulston, Lompoc; Staci M. Richard, Piedmont; Shashi B. Davè; Thomas E. Sulpizio, both of Lompoc, all of Calif.

[73] Assignee: Advanced Minerals Corporation, Lompoc, Calif.

[21] Appl. No.: 08/727,399
[22] PCT Filed: Jul. 19, 1996
[86] PCT No.: PCT/US96/12040
§ 371 Date: Oct. 11, 1996
§ 102(e) Date: Oct. 11, 1996
[87] PCT Pub. No.: WO97/12657
PCT Pub. Date: Apr. 10, 1997

Related U.S. Application Data

[60] Provisional application No. 60/005,067, Oct. 6, 1995.
[51] Int. Cl.$^7$ ................................. A01N 1/02; B03B 5/30
[52] U.S. Cl. ............................. 435/2; 209/172.5
[58] Field of Search ............................ 435/2; 209/172.5

[56] References Cited

U.S. PATENT DOCUMENTS

| | | | |
|---|---|---|---|
| 3,640,813 | 2/1972 | Nerenberg et al. | 204/299 |
| 3,929,130 | 12/1975 | Hargest | 128/214 R |
| 3,929,646 | 12/1975 | Adler | 210/359 |
| 4,050,451 | 9/1977 | Columbus | 128/2 F |
| 4,219,411 | 8/1980 | Yen et al. | 209/213 |
| 4,258,001 | 3/1981 | Pierce et al. | 422/56 |
| 4,269,718 | 5/1981 | Persidsky | 210/787 |
| 4,285,464 | 8/1981 | Latham, Jr. | 233/26 |
| 4,287,068 | 9/1981 | Bewley | 210/510 |
| 4,303,193 | 12/1981 | Latham, Jr. | 233/23 A |
| 4,356,958 | 11/1982 | Kolobow et al. | 233/27 |
| 4,419,089 | 12/1983 | Kolobow et al. | 494/45 |
| 4,425,237 | 1/1984 | Abe et al. | 210/692 |
| 4,640,785 | 2/1987 | Carroll et al. | 210/782 |
| 4,675,286 | 6/1987 | Calenoff | 435/7 |
| 4,698,311 | 10/1987 | Hall et al. | 436/10 |
| 4,752,563 | 6/1988 | Kortright et al. | 435/2 |
| 4,767,396 | 8/1988 | Powers | 494/60 |
| 4,797,475 | 1/1989 | Terasaki et al. | 530/387 |
| 4,816,168 | 3/1989 | Carrol et al. | 210/782 |
| 4,844,818 | 7/1989 | Smith | 210/782 |
| 4,915,839 | 4/1990 | Marinaccio et al. | 210/500.23 |
| 4,917,801 | 4/1990 | Luderer et al. | 210/516 |
| 4,923,620 | 5/1990 | Pall | 210/767 |
| 4,925,572 | 5/1990 | Pall | 210/767 |
| 4,927,749 | 5/1990 | Dorn | 435/2 |
| 4,927,750 | 5/1990 | Dorn | 435/2 |
| 4,957,638 | 9/1990 | Smith | 210/782 |
| 5,030,361 | 7/1991 | Ishida et al. | 210/772 |
| 5,053,134 | 10/1991 | Luderer et al. | 210/516 |
| 5,100,564 | 3/1992 | Pall et al. | 210/782 |
| 5,116,724 | 5/1992 | Delaage et al. | 435/2 |
| 5,152,905 | 10/1992 | Pall et al. | 210/767 |
| 5,217,627 | 6/1993 | Pall et al. | 210/767 |
| 5,227,066 | 7/1993 | Ishida et al. | 210/360.1 |
| 5,229,012 | 7/1993 | Pall et al. | 210/767 |
| 5,240,856 | 8/1993 | Goffe et al. | 435/299 |
| 5,246,829 | 9/1993 | Delaage et al. | 435/2 |
| 5,258,126 | 11/1993 | Pall et al. | 210/767 |
| 5,275,933 | 1/1994 | Teng et al. | 435/2 |
| 5,279,936 | 1/1994 | Vorpahl | 435/2 |
| 5,302,299 | 4/1994 | Pascale et al. | 210/767 |
| 5,316,674 | 5/1994 | Pall et al. | 210/257.1 |
| 5,339,268 | 8/1994 | Machida | 365/49 |
| 5,344,561 | 9/1994 | Pall et al. | 210/508 |
| 5,360,545 | 11/1994 | Pall et al. | 210/505 |
| 5,385,707 | 1/1995 | Miltenyi et al. | 422/69 |
| 5,411,863 | 5/1995 | Miltenyi | 435/6 |
| 5,432,054 | 7/1995 | Saunders et al. | 435/2 |
| 5,437,987 | 8/1995 | Tens et al. | 435/7.25 |
| 5,445,736 | 8/1995 | Pall et al. | 210/257.1 |
| 5,514,537 | 5/1996 | Chandler | 435/2 |

FOREIGN PATENT DOCUMENTS

| | | |
|---|---|---|
| 0 612 550 | 8/1994 | European Pat. Off. . |
| 2571498 | 4/1986 | France . |

OTHER PUBLICATIONS

Bear, J. (1988), *Dynamics of Fluids in Porous Media* (New York: Dover Publications, Inc.), pp. 161–176.

Carman, P. (1937), "Fluid Flow Through Granular Beds," *Trans. Institution of Chem. Eng.*, pp. 150–166.

Heertjes, P., et al. (1949), "Studies in Filtration, Part I," *Recueil*, 68, pp. 361–383.

Heertjes, P., et al. (1966), "2. Filter Blocking, Filter Media and Filter Aids," in *Solid–Liquid Separation* (London: Her Majesty's Stationery Office), pp. 37–43.

Hellem, A. (1971), "The Effect of Filter Age in Platelet Adhesiveness Test," *Scand. J. Haemat.* 8, pp. 180–182.

Hermanson, G., et al. (1992), *Immobilized Affinity Ligand Techniques* (San Diego: Academic Press Inc.).

Junqueira, L., et al. (1975), "13. Blood Cells," in *Basic Histology* (Los Altos, California: Lange Medical Publications), pp. 223–239.

Kiefer, J. (1991), "Kieselguhr Filtration: Overview of Theoretical Principles," *Brauwelt International* IV/1991, pp. 300–309.

Lloyd, P., et al. (1975), "Filtration Applications of Particle Characterization," *Filtration & Separation*, May/Jun. 1975, pp. 246–253.

(List continued on next page.)

*Primary Examiner*—Jon P. Weber
*Assistant Examiner*—Vera Afremova
*Attorney, Agent, or Firm*—Morrison & Foerster LLP

[57] ABSTRACT

This invention relates to the selective separation of particles according to particle size. More particularly, this invention pertains to advanced particulate media which are carefully sized so as to permit precise and selective separation of microparticles suspended in fluids according to particle size, and to methods of using these advanced particulate media to achieve precise and selective separation.

35 Claims, 3 Drawing Sheets"

OTHER PUBLICATIONS

Nordén H., et al. (1994), "Application of Volume Balances and the Differential Diffusion Equation to Filtration," *Separation Science and Technology* 29:10, pp. 1319–1334.

Pitney, W., et al. (1967), "Retention of Platelets by Glass Bead Filters," *J. clin. Path.* 20, pp. 710–716.

Ruth, B. (1946), "Correlating Filtration Theory with Industrial Practice," Industrial and Engineering Chemistry, 38:6, pp. 564–571.

Sperry, D. (1916), "The Principles of Filtration," *Metallurgical and Chemical Eng.* XV:4, pp. 198–203.

Tarleton, E., et al. (1994), "Simulation, Modelling and Sizing of Pressure Filters," *Filtration and Separation;* Jun. 1994, pp. 393–397.

Tianshou, C. (1988), "Size Separation for Hard Microparticulates," *Materials Science and Engineering,* A105/106, pp. 571–576.

Tiller, F. (1953), "The Role of Porosity in Filtration: Numerical Methods for Constant Rate and Constant Pressure Filtration Based on Kozeny's Law," *Chemical Engineering Progress,* 49:9, pp.467–479.

Tiller, F., et al. (1962), "The Role of Porosity in Filtration: Part V," *A.I.Ch.E. Journal,* 8:4, pp. 445–449.

Tiller, F., et al. (1964), "The Role of Porosity in Filtration: Part VI. New Definition of Filtration Resistance," *A.I.Ch.E. Journal,* 10:1, pp. 61–67.

METHOD OF MECHANICALLY SEPARATING MICROPARTICLES SUSPENDED IN FLUIDS USING PARTICULATE MEDIA

This application is a 371 of PCT/US96/12040 Jul. 19, 1996 which claim benefit of 60/005,067 filed Oct. 6, 1995.

TECHNICAL FIELD

This invention relates to the selective separation of particles according to particle size. More particularly, this invention pertains to advanced particulate media which are carefully sized so as to permit precise and selective separation of microparticles suspended in fluids according to particle size, and to methods of using these advanced particulate media to achieve precise and selective separation.

BACKGROUND

Throughout this application, various publications, patents, and published patent applications are referred to by an identifying citation; full citations for these documents may be found at the end of the specification. The disclosure of the publications, patents, and published patent specifications referenced in this application are hereby incorporated by reference into the present disclosure to more fully describe the state of the art to which this invention pertains.

The present invention relates to particulate products, hereinafter referred to as "advanced particulate media" or "particulate separation media" which have been carefully sized so as to permit the precise and selective separation of microparticles suspended in fluids, methods of using these media, the passing microparticulate suspensions obtained using these methods. The media and methods of the present invention are useful for generally reducing the quantity of coarse particulates (i.e., those with a particle size above a certain threshold) from a suspension while affording a means for selectively recovering finer particulates (i.e., those with a particle size below a certain threshold) suspended in a fluid. Unlike materials and methods used in general filtration (e.g., to remove particulates) and chromatography (e.g., to resolve particles), the advanced particulate media of the present invention, and their use, permit selective separation of microparticles according to particle size, in a manner analagous to a mechanical low pass filter.

The precise and selective separation of particles suspended in fluids according to particle size is a branch of the more general field of filtration. Filtration is a common means used to clarify fluids. Simple mechanical sieving and screening are often useful to provide filtration of coarse particulate matter, and numerous technologies using cyclones, hydrocyclones, and air classification have been employed to crudely separate particles in fluids. These types of filtration are often referred to as coarse filtration or particle filtration.

Ultrafiltration, which includes techniques such as cross-flow filtration, gel permeation, and size exclusion chromatography are commonly used for analytical separations of macromolecules, colloidal suspensions, and ultrafine particulate matter which typically have particle sizes of less than 0.1 $\mu$m.

Between particle filtration and ultrafiltration lies the region of microfiltration, for which the particulate matter to be separated is of a size range which usually results in visibly turbid fluids. Within the regions of microfiltration and particle filtration, the removal or separation of particulate matter roughly within the size range of 0.1 $\mu$m to 500 $\mu$m (i.e., microparticles) is usually accomplished on a small scale using membranes or papers constructed from natural, polymeric, or ceramic fibers. On larger commercial scale filtrations, or for increased filtration efficiency, particulate media such as diatomite are usually retained in a packed bed on a screen mesh or similar mechanical septum such as those used for coarse filtrations, thus offering superior convenience and economy for microfiltration.

The object of microfiltration, however, is usually to obtain clarity rather than selective particle separation within the microparticulate range. It is the typical goal of microfiltration to attempt to separate (or remove) all particulate matter from the fluid in which it is suspended, rather than perform a precise size separation of the particles suspended in a fluid and thereby leave certain particles suspended in the fluid.

Similarly, the advanced particulate media of the present invention and the methods of their use differ from the techniques used in size exclusion chromatography. The latter technique permits the resolution of particles according to size, that is, size exclusion chromatography provides the sequential separation of particles according to particle size. Like other chromatographic methods, size exclusion chromatography relies on the rate at which particles pass through the media to control the distribution of the particle sizes in the flowing stream, and thereby effect separation or resolution of very fine particles. To effect this resolution, size exclusion chromatography also requires uniformity of the particle size of the media. In sharp contrast, the advanced particulate media and the methods of using these media, as disclosed herein, effect separation of particles according to size with respect to a threshold. In this regard, the advanced particulate media of the present invention may conveniently be considered to be analogous to a mechanical low pass filter.

The working principles of filtration using particulate media have been developed over many years (Carman, 1937; Heertjes, 1949, 1966; Ruth, 1946; Sperry, 1916; Tiller, 1953, 1962, 1964), and have been recently reviewed in detail from both practical perspectives (Kiefer, 1991) as well as from their underlying theoretical principles (Bear, 1988; Norden, 1994). As a result, a number of methods to obtain optimum fluid clarity and process optimization have now been developed (e.g., Tarleton, 1994). A number of the theoretical principles of separating microparticulates have been discussed (Lloyd, 1975; Tianshou, 1988).

Particulate media are commonly used in three types of filtration techniques: (i) as stable but unconsolidated packed beds in depth filtration; (ii) as filter aids to pre-coat a septum and obtain spacing between microparticulates in the filter cake through continuous body feeding; and, (iii) as components of composites such as filter sheets, filter pads, or filter cartridges.

Depth filtration, in which a fluid is passed through a stable packed bed of unconsolidated media, is the most common method of water filtration. Rapid sand filtration and slow sand filtration are the most popular methods of filtration for municipal water facilities, which may use a variety of media in practice, for example, silica sand, silica gravel, anthracite, and garnet. Rapid sand and other types of depth filtration have historically been nonselective means of separation. The objective of this type of filter has been to remove microparticulate detritus, for example, algae, bacteria, and other kinds of microorganisms, while still allowing for high flow rates and low operating costs.

In the field of filtration, many methods of relatively nonselective particle separations from fluids involve the use of filter aids, that is, media intended to clarify the fluid from particulate matter. Examples of commonly used filter aids include diatomite and perlite, often preferred because of their high efficiency in practical filtration. Filter aids are often applied to a septum or support to improve clarity and increase flow rate in filtration processes, in a step sometimes referred to as "pre-coating." Filter aids are often added directly to a fluid as it is being clarified to lessen resistance to flow by reducing the load of undesirable particulate turbidity at the septum while maintaining a designed liquid flow rate, in a step often referred to as "body feeding." Depending on the particular clarification involved, filter aids may be used in pre-coating, body feeding, or both.

In some clarifying filtration applications, different filter aids are blended together to further modify or optimize the filtration process. In some cases, the combinations may involve simple mixtures of, for example, diatomite or perlite with cellulose, activated charcoal, clay, or other materials. In other cases, the combinations are composites in which filter aid products are intimately compounded with other ingredients to make sheets, pads, or cartridges. Still more elaborate modifications of these products are used for filtration, involving, for example, surface treatment or the addition of chemicals to filter aid products, mixtures, or their composites.

There are many cases in which the selective separation of particles is the desired outcome of a treatment process. In these situations, particles of two or more populations may be found together suspended in a fluid where removal of the coarser population and recovery of the finer population is highly desirable.

For example, there are many industrial microparticulate products, such as fillers and pigments, in which the utility and value of the product is enhanced if a product can be produced which contains few or no particles above a certain threshold diameter. For example, paint fillers with a specific particle size distribution are often used to adjust the texture of paint (e.g., high gloss, satin, or flat finish). Current industrial methods of obtaining such fillers, such as air cycloning, are often inadequate to provide fillers with optimum properties, such as particle size.

Another example in which the selective separation of particles according to size is desirable involves the specific separation of cell types in blood. Examples include the separation of white blood cells (i.e., leukocytes or leucocytes) from red blood cells (i.e., erythrocytes), and the separation of white blood cells from platelets, with the need to recover as many of the red blood cells or platelets, respectively, as possible.

The characteristics of these cellular components have been reviewed (Junqueira, 1975). Red blood cells are biconcave discs with an average maximum dimension of approximately 7.2 $\mu$m, while platelets are cytoplasmic fragments having an average maximum dimension of approximately 5 $\mu$m. While white blood cells are of several varieties, histology divides them into the larger granulocytes (e.g., neutrophils, basophils, eosinophils), which are spheroidal cells approximately 9 to 12 $\mu$m in average maximum dimension, and the smaller agranulocytes (e.g., monocytes and lymphocytes), which are spheroidal cells approximately 6 to 12 $\mu$m in average maximum dimension. Granulocytes undergo a process known as expansion when they contact solid surfaces, changing from a spheroidal shape to an amoeboid form, with the average maximum dimension increasing to approximately 22 $\mu$m.

A number of methods to separate leukocytes from red blood cells and platelets have been developed, the most common methods being based upon filter elements composed of treated polymeric fibers (e.g., Pall, 1990a, 1990b, 1992a, 1992b, 1993a, 1993b, 1993c, 1994a, 1994b, 1994c, 1995a, 1995b; Pascale, 1994). A gel pre-filter and microaggregate filter are often suggested for use in combination with these in order to augment their performance. Often, extensive surface modifications to fibers are needed to obtain the desired separation properties (Marinaccio, 1990). In one instance, a fibrous glass filter has been used in conjunction with centrifugation to separate fibrin from serum (Adler, 1975). A study of the retention of platelets by glass bead filters was an example of filtration (Pitney, 1967), and platelet adhesion to glass beads has been examined in detail (Hellem, 1971) but, unlike the advanced particulate media of the present invention, the objective of these studies was not to obtain precise size selectivity.

Several methods for cell separation have been developed that rely on fluid mechanical principles of centrifugation rather than using porous media as means of separation (Goffe, 1993; Ishida, 1988, 1991, 1993; Powers, 1988; Hall, 1987; Kolobow, 1982, 1983; Latham, 1981a, 1981b; Columbus, 1977). Fetal red blood cells have been separated from maternal blood using centrifugation and gradient gels (Saunders, 1995; Teng, 1994, 1995), and by immobilized antibody binding (Calenoff, 1987). Agranulocytes have been separated from heavier blood components (Luderer, 1990, 1991; Terasaki, 1989), and other cell mixtures have been separated by attachment of organosilanized colloidal silica followed by density gradient centrifugation (Dorn, 1990a, 1990b).

Cells are reported to selectively bind to particles coated with antibodies, the coated particles having a relative density less than unity. These floating particles can then be concentrated, thus separating immunologically responsive cells, including white blood cell populations, from those which are not (Delaage, 1984, 1992, 1993). Granulocytes have been separated from agranulocytes by thixotropic gels (Smith, 1989, 1990) and related controlled buoyancy techniques (Carroll, 1987, 1989). Red blood cells have been chemically adsorbed to the surfaces of microspheres coated with antibodies, preferentially allowing leukocytes to remain in plasma while the microspheres are removed by magnetically induced agglutination (Kortwright, 1988). Other magnetic separations have also been described (e.g., Miltenyi, 1995a, 1995b; Yen, 1980; Vorpahl, 1994).

A method for separating certain lymphocytes from other leukocytes using porous particulate polymers in conjunction with animal serum proteins has been reported (Abe, 1984). An element for the analysis or transport of liquids, including biological fluids, created by joining polymeric particles with adhesive, has been described (Pierce, 1981). These methods rely on particulate polymers as a support to effect separation based on chemical affinity, rather than on selective discrimination of particle diameters as employed in the present invention.

DISCLOSURE OF THE INVENTION

One aspect of the present invention pertains to advanced particulate media which permit the selective separation of microparticles from a suspension of microparticles in a fluid according to particle size, which media has a standard selectivity equal to or greater than 4.0. Preferred media are those selected from the group consisting of: particulate media with a median particle diameter equal to or greater than 20 $\mu$m up to 35 $\mu$m with a media index equal to or greater than 0.60; particulate media with a median particle diameter greater than 35 μm up to 180 μm with a media index equal to or greater than 1.0; particulate media with a median particle diameter greater than 180 μm up to 500 μm with a media index equal to or greater than 2.0; and particulate media with a median particle diameter greater than 500 μm up to 1400 μm with a media index equal to or greater than 3.0.

Another aspect of the invention pertains to methods of selectively separating microparticles from a suspension of microparticles in a fluid according to particle size, which method comprises the steps of: (a) providing on a support an advanced particulate media having a standard selectivity equal to or greater than 4.0, selected from the group consisting of: particulate media with a median particle diameter equal to or greater than 20 μm up to 35 μm with a media index equal to or greater than 0.60; particulate media with a median particle diameter greater than 35 μm up to 180 μm with a media index equal to or greater than 1.0; particulate media with a median particle diameter greater than 180 μm up to 500 μm with a media index equal to or greater than 2.0; and particulate media with a median particle diameter greater than 500 μm up to 1400 μm with a media index equal to or greater than 3.0; and (b) passing said microparticulate suspension through said advanced particulate media, thereby effecting selective separation according to particle size.

In some preferred embodiments, said advanced particulate media comprises rigid particles, such as minerals or products of mineral origin, a polymeric material, inorganic salts, metals, or glasses. In some preferred embodiments, said advanced particulate media comprises particles compressible to the dimensional criteria expressed therein for rigid particles, such as a polymeric material.

In some preferred embodiments, said microparticulate suspension comprises rigid particles. In some preferred embodiments, said microparticulate suspension comprises compressible particles.

In some preferred embodiments, said microparticulate suspension comprises cells or cellular components, such as white blood cells, red blood cells, and platelets; white blood cells and red blood cells; and white blood cells and platelets.

In some preferred embodiments, said fluid is of biological origin, such as blood, or a fluid derived from blood.

In some preferred embodiments, the passage of said microparticulate suspension through said advanced particulate medium is aided by gravity. In some preferred embodiments, the passage of said microparticulate suspension through said advanced particulate medium is aided by the application of a positive pressure in advance of said support. In some preferred embodiments, the passage of said microparticulate suspension through said advanced particulate medium is aided by the application of a negative pressure beyond said support.

In some preferred embodiments, additional advanced particulate media is added to said microparticulate suspension. In some preferred embodiments, said advanced particulate media is incorporated into a composition in a form selected from the group consisting of a pad, a sheet, and a cartridge. In some preferred embodiments, said advanced particulate media is contained within a filter that is less hydrophilic than the advanced particulate media.

In some preferred embodiments, particles retained by said advanced particulate media are collected, harvested, concentrated, or retrieved. In some preferred embodiments, said particles retained comprise rigid particles. In some preferred embodiments, said particles retained comprise compressible particles. In some preferred embodiments, said particles retained comprise cells, such as white blood cells.

Still another aspect of the invention pertains to the passing microparticulate suspension obtained using any of the methods of the second aspect of the invention, and particularly, such methods wherein said microparticulate suspension comprises cells or cellular components.

MODES FOR CARRYING OUT THE INVENTION

A. The Advanced Particulate Media

The advanced particulate media of the present invention are able to achieve a much more precise separation of waste coarse microparticulates from fine microparticulates at a chosen threshold than is possible than with conventional particulate media.

The advanced particulate media of the present invention, and their use, permit selective separation of microparticles according to particle size, in a manner analagous to a mechanical low pass filter. The media and methods of the present invention are useful for generally reducing the quantity of coarse particulates (i.e., those with a particle size above a certain threshold) from a suspension while affording a means for selectively recovering finer particulates (i.e., those with a particle size below a certain threshold) suspended in a fluid. The media of the present invention are effective in this regard because they have a narrow particle size distribution. Such media possess very uniform interparticulate void spaces (i.e., spaces between media particles) which are too fine to permit the passage of undesirable coarse microparticulates, yet are sufficiently large to readily permit the passage of fine microparticulates. The absence of extraneous fine particles in the media composition prevents undesirable bridging effects which would otherwise reduce the precision of the separation and block passage of all but extremely fine microparticulates.

The particle size distribution of a suspension of particles can be determined using any of a number of well known methods, including, for example, laser diffraction, microscopy, image analysis, sedimentation (using Stoke's law), a Coulter counter, and passage through an aperture.

Many reliable analytical instruments and methods are available for the rapid and accurate determination of particle size distributions of particles in suspensions. The preferred method for determining particle size distribution employs laser diffraction. The preferred instrument for determining the particle size distribution of the advanced particulate media and microparticulate suspensions is a Leeds & Northrup Microtrac Model X-100. The instrument is fully automated, and the results are obtained using a volume distribution formatted in geometric progression of 100 channels, running for 30 seconds with the filter on. The distribution is characterized using an algorithm to interpret data from the diffraction pattern which assumes the particles have spherical shape characterized by a diameter, D. An upper particle diameter limit of the particle size distribution is conveniently identified by the instrument as $D_{90}$, that is, 90% of the total particle volume is accounted for by particles having diameters equal to or less than this value. The median particle diameter is identified as $D_{50}$, that is, 50% of the total particle volume is accounted for by particles having a diameter equal to or less than this value. A lower particle diameter limit of the particle size distribution is identified as $D_{10}$, that is, 10% of the total particle volume is accounted for by particles having diameters equal to or less than this value.

The advanced particulate media of the present invention have median particle diameters of about 20 to about 1400 microns.

A useful corresponding property of the separation media, known as the "media index," m, can be readily calculated from particle size distribution data according to the following equation:

$$m = D_{50(m)}/(D_{90(m)} - D_{10(m)})$$

wherein $D_{50(m)}$, $D_{90(m)}$, and $D_{10(m)}$ are the $D_{50}$, $D_{90}$, and $D_{10}$ values for the separation media, respectively, reported in microns. For example, if $D_{90(m)}$ is equal to 128.4, $D_{10(m)}$ is equal to 68.90, and $D_{50(m)}$ is equal to 92.13, then m is equal to 1.5. The greater the value of m, the more narrow is the distribution of particles sizes about the median particle size.

For advanced particulate media of the present invention which have a median particle diameter of about 20 to 35 μm, the media index is preferably greater than or equal to 0.60 (usually from about 0.60 to about 1.2), more preferably greater than or equal to 0.80 (usually from about 0.80 to about 1.2), still more preferably greater than or equal to 1.0 (usually from about 1.0 to about 1.2).

For advanced particulate media of the present invention which have a median particle diameter greater than 35 μm up to 180 μm, the media index is preferably greater than or equal to 1.0 (usually from about 1.0 to about 2.0), more preferably greater than or equal to 1.3 (usually from about 1.3 to about 2.0), still more preferably greater than or equal to 1.6 (usually from about 1.6 to about 2.0).

For advanced particulate media of the present invention which have a median particle diameter greater than 180 μm up to 500 μm, the media index is preferably greater than or equal to 2.0 (usually from about 2.0 to about 4.0), more preferably greater than or equal to 2.5 (usually from about 2.5 to about 4.0), still more preferably greater than or equal to 3.0 (usually from about 3.0 to about 4.0).

For advanced particulate media of the present invention which have a median particle diameter greater than 500 μm up to about 1400 μm, the media index is preferably greater than or equal to 3.0 (usually from about 3.0 to about 6.0), more preferably greater than or equal to 4.0 (usually from about 4.0 to about 6.0), still more preferably greater than or equal to 5.0 (usually from about 5.0 to about 6.0).

A property defined as the "feed microparticulate spread," f, can be readily calculated from particle size distribution data of a microparticulate suspension that has not been subjected to separation treatment according the following equation:

$$f = 40/(D_{90(f)} - D_{50(f)})$$

wherein $D_{90(f)}$ and $D_{50(f)}$ denote the $D_{90}$ and $D_{50}$ values for the feed suspension, respectively, reported in microns. For example, if $D_{90(f)}$ is equal to 8.518, and $D_{50(f)}$ is equal to 4.510, then f is equal to 9.98. The value of f is specific to the particular feed suspension used in an actual experiment or process.

In a similar fashion, a property defined as the "passing microparticulate spread," p, can be readily calculated from particle size distribution data of microparticulate suspensions that have been subjected to separation using the advanced particulate media of the present invention according the following equation:

$$p = 40/(D_{90(p)} - D_{50(p)})$$

wherein $D_{90(p)}$ and $D_{50(p)}$ denote the $D_{90}$ and $D_{50}$ values for the passing suspension, respectively, reported in microns. For example, if $D_{90(p)}$ is equal to 4.480, and $D_{50(p)}$ is equal to 2.978, then p is equal to 26.7.

If the magnitude of the passing microparticulate spread, p, is greater than that of the feed microparticulate spread, f, (that is, p/f>1) then selective particle size separation has taken place. The "relative selectivity," S, can readily be calculated from the equation:

$$S = p/f$$

wherein p and f are as defined above. The greater the value of S, the greater is the selectivity.

For example, if the feed suspension has a feed microparticulate spread, f, of 9.98, and the passing suspension has a passing microparticulate spread, p, of 26.7 (for a specific advanced particulate media), then the relative selectivity (for that media) is calculated to be 2.68. In another separation using the same feed suspension (with the same microparticulate spread of 9.98) but a different advanced particulate media, the passing suspension may be determined to have a passing microparticulate spread of only 14.0; the relative selectivity for this separation calculates to only 1.40. Although selective separation has taken place in both instances (i.e., S>1) for the particular feed used, the former advanced particulate media has greater relative selectivity than the latter.

For evaluation of media performance, the "standard selectivity," S', is determined using a standard microparticulate suspension. For the purposes of this disclosure, a standard microparticulate suspension is defined to be one in which the percent volume occupied by particles of different diameters, as determined using the preferred laser diffraction method, is equal throughout the distribution, such that $D_{90(r)}$ is equal to 18.65 and $D_{50(r)}$ is equal to 5.00.

The reference microparticulate spread, r, of this standard microparticulate suspension can be readily calculated using the following equation:

$$r = 40/(D_{90(r)} - D_{50(r)}) = 2.93$$

wherein $D_{90(r)}$ and $D_{50(r)}$ are the $D_{90}$ and $D_{50}$ values for the standard suspension, respectively, reported in microns.

If f=r, that is, if the feed microparticulate suspension is identical to the standard microparticulate suspension, then the standard selectivity, S', can be calculated according to the following equation:

$$S' = p/f = p/r$$

For non-standard feed microparticulate suspensions that have sufficiently broad particle size distributions to cover the region of interest, such that p remains essentially unchanged if f<>r, the standard selectivity can be estimated from the following equation:

$$S' \approx S + (f/r)$$

that is, the relative selectivity is proportional to the standard selectivity as the feed microparticulate spread is proportional to the reference microparticulate spread. For example, if the feed suspension has a feed microparticulate spread, f, of 9.66, and a specific separation process is found to have a relative selectivity, S, of 1.45, and r is known to be 2.93 (as described above), then an estimate of the standard selectivity, S', can be calculated to be 4.78.

The advanced particulate media of the present invention have a standard selectivity equal to or greater than 4.0 (usually from about 4.0 to about 40), more preferably equal to or greater than 5.0 (usually from about 5.0 to about 40), still more preferably equal to or greater than 6.0 (usually from about 6.0 to about 40), yet more preferably equal to or greater than 8.0 (usually from about 8.0 to about 40), still more preferably equal to or greater than 10.0 (usually from about 10.0 to about 40).

B. Methods of Preparing the Advanced Particulate Media

As described above, the advanced particulate media of the present invention possess a narrow particle size distribution. Any known method for preparing particulate media possessing the desired narrow particle size distribution and having the desired media index and standard selectivity may be used. Such methods include, for example, sieving, sedimentation, or cycloning.

In a typical method, the advanced particulate media can be prepared by screening particulates to pass through a sieve composed of wire mesh screen of given nominal sieve openings, and retaining particulates on a sieve composed of wire mesh screen that has smaller nominal sieve openings, as described in the examples below.

The advanced particulate media of the present invention may be prepared from any material which is compatible with the fluid and particles of the particle suspension to be treated, provided the desired particle size distribution, media index, and standard selectivity may be obtained. For example, suitable materials are those which are physically stable (for example, in a particular high or low temperature range or in a particular fluid) and chemically inert (for example, unreactive towards the fluid of the suspension), under the conditions of the separation process.

The advanced particulate media can be prepared from relatively rigid particles, such as those prepared from flux-calcined diatomite as described in the examples below. Other examples of suitable materials from which rigid particles may be obtained include other minerals or products of mineral origin (e.g., diatomite or silica sand), glass (e.g., borosilicate), metal (e.g., stainless steel or inconel), or inorganic salts (e.g., calcium silicate). Other rigid particles include hard polymeric materials, for example, rigid plastics (e.g., polycarbonate or polytetrafluoroethylene).

The advanced particulate media can also be made from materials which are compressible to the dimensions of rigid particles. Such materials include, for example, soft polymers (e.g., latexes, polyolefins, granulated starch). For advanced particulate media prepared from compressible particles, the media index, median particle diameter, and selectivity are those determined under the actual conditions of use (that is, as compressed during the separation process).

Additional desirable properties, including enhanced selectivity, can be obtained by further modifying the advanced particulate media. For example, the surface of the advanced particulate media prepared from siliceous substances (e.g., diatomite, perlite, silica sand, siliceous glasses) can be modified by chemical treatment to render the product more hydrophobic or more hydrophilic. The advanced particulate media can be placed in a plastic vessel, and a small quantity of a silanization agent (for example, dimethyldichlorosilane, i.e., $SiCl_2(CH_3)_2$, or hexamethyldisilazane, i.e., $(CH_3)_3Si-NH-Si(CH_3)_3$) added to the vessel. Reaction is allowed to take place at the surface in the vapor phase over a 24 hour period. Such products are hydrophobic, and improved mechanical performance is expected in applications involving similarly hydrophobic fluids (e.g., hydrocarbons or oils). Similarly, the advanced particulate media can be modified by reaction in an aqueous suspension containing 10% (w/v) aminopropyltriethoxysilane (i.e., $C_9H_{23}NO_3Si$) in water, refluxing at 70° C. for 3 hours, filtering the mixture, and drying the solids in air to obtain a more hydrophilic surface. This particular modification is desirable to permit further derivatization of the advanced particulate media, having converted terminal hydroxyl (i.e., —OH) functional groups of the surface of the siliceous particulate to aminopropyl groups (i.e., —$(CH_2)_3$ $NH_2$). The hydrophilic (e.g., aminosilanized) modification of the advanced particulate media can further be reacted to bind an organic compound, for example, a protein, which can further enhance selectivity. A number of other reactions pertaining to the derivatization of siliceous matter as well as other materials have been previously described (Hermanson, 1992).

Figure 1:
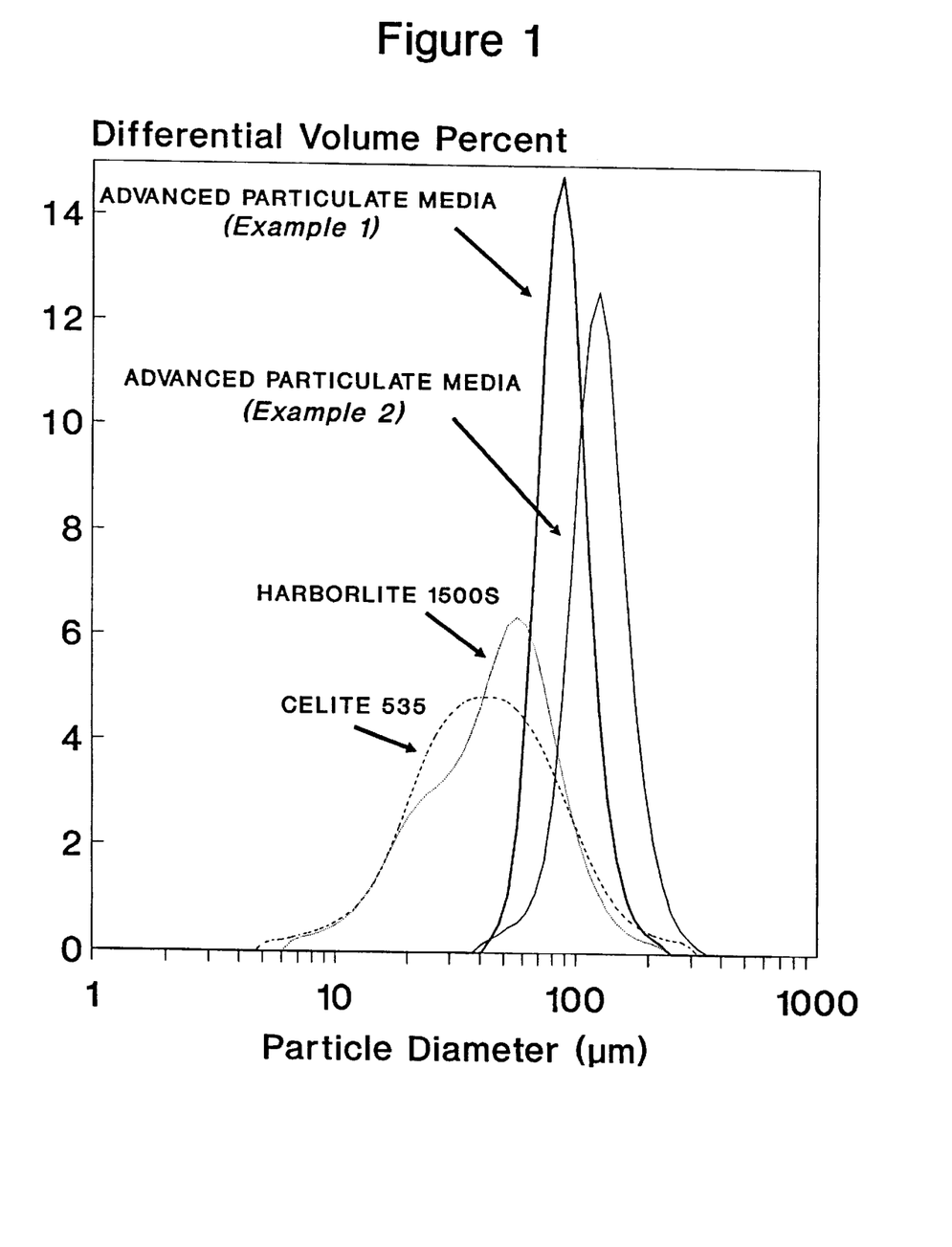
FIG. 1 is graph depicting the particle size distribution, as the differential volume percent versus particle diameter, for the advanced particulate media described in Examples 1 and 2, as well as for HARBORLITE 1500S and CELITE 535.

The particle size distributions of various media are compared graphically in FIG. 1. The particle size distributions of the advanced particulate media shown are those of Examples 1 and 2, having a median particle diameter of 92.13 μm and a media index of 1.5, and a median particle diameter of 127.4 μm and a media index of 1.2, respectively. CELITE 535 (Celite Corporation, Lompoc, Calif.) is a graded flux calcined diatomite filter aid, having a median particle diameter of 40.71 μm and a media index of 0.51. HARBORLITE 1500S (Harborlite Corporation, Lompoc, Calif.) is a graded perlite filter aid, having a median particle diameter of 50.06 μm and a media index of 0.66.

C. Methods of Using the Advanced Particulate Media

The advanced particulate media of the present invention, and their use, permit selective separation of microparticles according to particle size, in a manner analogous to a mechanical low pass filter. The media and methods of the present invention are useful for generally reducing the quantity of coarse particulates (i.e., those with a particle size above a certain threshold) from a suspension while affording a means for selectively recovering finer particulates (i.e., those with a particle size below a certain threshold) suspended in a fluid.

The precision of the separation (as indicated, for example, by the reduction of particles with particle size above a specified threshold) may be chosen and/or optimized for the particular application at hand. For certain applications, very selective separations (with almost complete removal of coarse particles) may be desirable. Alternatively, in other applications, only moderately selective separations (with a moderate reduction of coarse particles) may be acceptable or desired for reasons such as, for example, economy and intended end-use.

The advanced particulate media of the present invention may be used in a wide variety of methods of achieve separation of particles according to size. The advanced particulate media of the present invention may generally be used in any method in which the media can be supported (that is, by a support). One example of a support is a septum, such as a mesh screen, membrane, or pad.

The present invention provides a method of selectively separating microparticles from a suspension of microparticles in a fluid (i.e., a microparticulate suspension) according to particle size, which method comprises the steps of: (a)

providing on a support the advanced particulate media of the present invention; and (b) passing the microparticulate suspension through the media, thereby effecting selective separation according to particle size.

Passage of the microparticulate suspension through the media may be aided, for example, by gravity. Similarly, passage of the microparticulate suspension through the media may be aided by a positive pressure applied in advance of the support (using, for example, a compatible material such as a gas), or by a negative pressure (i.e., vacuum) applied beyond the support, provided that the desired properties of the media (e.g., particle size, media index, etc.) are maintained under those conditions. The separation method may be performed at reduced or elevated temperature (e.g., of the media, the suspension, or both), provided the desired properties of the media (e.g., chemical state, chemical reactivity, particle size, media index, etc.) are maintained under those conditions. The advanced particulate media may also be prepared and used in the form of composites, such as sheets, pads, or cartridges.

The advanced particulate media of the present invention is useful for the selective separation of both rigid and compressible microparticles.

For example, in one embodiment of the present invention, coarse microparticulates from a suspension of an industrial filler material (e.g., diatomite, silica, calcium carbonate) or pigment material (e.g., titanium dioxide) can be selectively removed from the desired finer microparticulates by a method which passes the suspension through a bed of the advanced particulate media of the present invention contained in a column and supported by a septum (e.g., wire mesh screen or fiber pad). Further increased throughput can be accomplished for this method by several means. For example, the column can be pressurized with a compatible material (e.g., air or nitrogen) applied in advance of the septum to accelerate the passage of fine microparticulates suspended in fluid through the advanced particulate media. The column can also or alternatively be subjected to vacuum applied beyond the septum in order to accelerate the passage of fine microparticulates suspended in fluid through the advanced particulate media.

To further enhance the usefulness of the method, an additional quantity of advanced particulate media can be added to the feed microparticulate suspension as body feed to supplement the aforementioned septum pre-coated with the advanced particulate media. A quantity by weight resulting in approximately 1:1 advanced particulate media to feed microparticulate suspension is a typical starting point for rigid microparticulates of fillers and pigments like those described. Adding the advanced particulate media as body feed lessens resistance of the bed to flow as waste coarse microparticulates become trapped in the media during the course of the separation process, allowing the fine microparticulate suspension flow rate to be retained for a significantly longer period of time than with the pre-coated septum alone.

In another embodiment, larger white blood cells can be selectively removed from finer microparticulates that are desired in blood (e.g., red blood cells or platelets). For example, a feed microparticulate suspension of whole blood can be passed through the advanced particulate media of the present invention contained in a column and supported by a septum (e.g., mesh screen, membrane, or pad), resulting in selective separation of white blood cells while permitting suspended red blood cells to pass. In another example, a feed microparticulate suspension of platelet concentrate can be passed through the advanced particulate media of the present invention contained in a column and supported by a septum (e.g., mesh screen, membrane, or pad), resulting in selective separation of white blood cells while permitting suspended platelets to pass. As in the mode of use described above, further increased throughput can be accomplished for this method by several means. For example, the column can be pressurized with a compatible material (e.g, air or nitrogen) applied in advance of the septum to accelerate the passage of fine microparticulates suspended in fluid through the advanced particulate media. The column can also or alternatively be subjected to vacuum applied beyond the septum in order to accelerate the passage of fine microparticulates suspended in fluid through the advanced particulate media.

As described above, to further enhance the usefulness of the method, an additional quantity of advanced particulate media can be added to the feed microparticulate suspension as body feed to supplement the aforementioned septum pre-coated with the advanced particulate media. A quantity by weight resulting in approximately 2:1 advanced particulate media to feed microparticulate suspension is a typical starting point for more compressible or deformable microparticulates like those of the cells described. Adding the advanced particulate media as body feed lessens resistance of the bed to flow as white blood cells become trapped in the media during the course of the separation process, allowing the fine microparticulate suspension flow rate to be retained for a significantly longer period of time than with the pre-coated septum alone.

While biological cells are somewhat deformable, the advanced particulate media of the present invention can also be applied to other deformable or compressible microparticulate suspensions.

Many other modifications and variations of the present invention as described above can be made without departing from the spirit and scope thereof.

D. Examples

Two advanced particulate media of the present invention, and methods for their preparation and use, are described in the following examples, which are offered by way of illustration and not by way of limitation.

Example 1

Advanced Particulate Media Prepared by Sieving Between 170 and 200 Mesh Sieves

In this example, 1 L of an aqueous microparticulate slurry containing a population of microspherical silica grains (Potter's Microspheres) was prepared by slurrying 0.3 grams of 3–4 $\mu$m microspheres, and 0.2 grams each of 5–6 $\mu$m microspheres, 6–8 $\mu$m microspheres, and 8–10 $\mu$m microspheres in sufficient deionized water to result in a final volume of 1 L. The aqueous microparticulate slurry of the example had a particle size distribution described by having a $D_{50(f)}$ of 4.510, and $D_{90(f)}$ of 8.518, yielding a feed microparticulate spread, f, of 9.98.

An advanced particulate media was prepared by sieving an acid washed flux calcined diatomite filter aid (CELITE 545; Celite Corporation, Lompoc, Calif.). First, the particulate was placed on a 170 mesh (90 $\mu$m nominal sieve opening) sieve, shaken through the sieve, and the coarse particles remaining on the sieve were discarded. The remaining particles were shaken over a 200 mesh (75 $\mu$m nominal sieve opening) sieve, with particles passing through the sieve discarded. The entire sieving sequence was then repeated using the media that was retained on the 200 mesh sieve, using a stream of water to further improve the media index by rinsing the media free of fines. The media was then dried in air at 1100 C for a minimum of 2 hours. A sufficient quantity of filter aid was screened to yield approximately 50 grams of media. The advanced particulate media of the example had a particle size distribution described by having a $D_{10(m)}$ of 68.90, $D_{50(m)}$ of 92.13, and $D_{90(m)}$ of 128.4, yielding a media index of 1.5.

A 1.5 cm bed of the advanced particulate media was placed in a stainless steel filtration funnel of 37 mm diameter, supported on a 325 mesh (45 µm) stainless steel septum, and approximately 300 mL of aqueous microparticulate slurry was introduced to the bed using gravity flow. The aqueous microparticulate suspension passing through the bed of the advanced particulate media had a particle size distribution described by having a $D_{50(p)}$ of 2.978 and $D_{90(p)}$ of 4.480, yielding a passing microparticulate spread of 26.67. The relative selectivity of this example is 2.67, and the standard selectivity is calculated to be 9.09.

Figure 2:
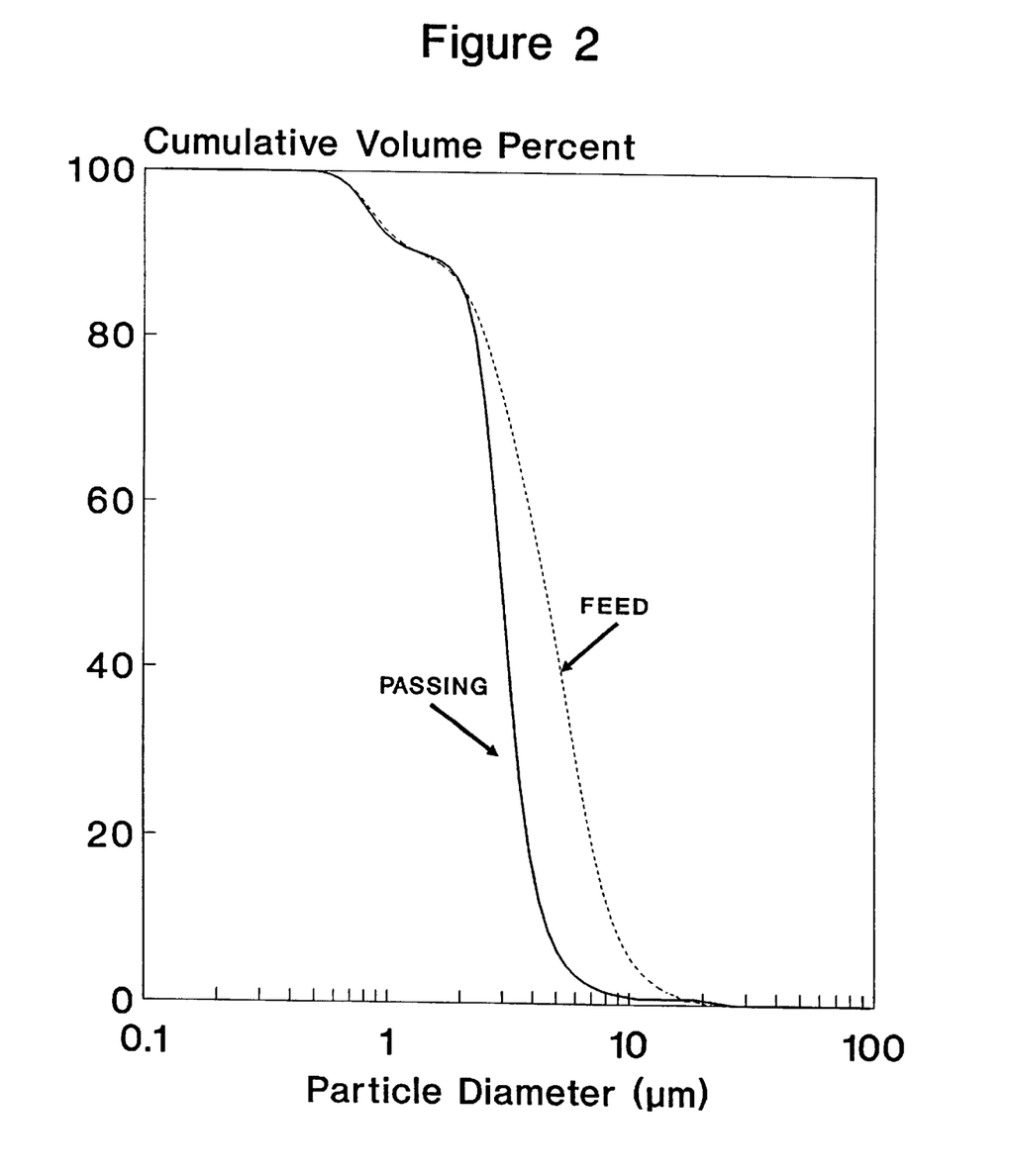
FIG. 2 is a graph depicting the particle size distribution, as cumulative volume percent versus particle diameter, for the feed particulate suspension and the passing microparticulate suspension of Example 1.

The results of this example are shown graphically in FIG. 2. The vast majority of microparticles with a diameter below about 2.0 µm were passed, while a large proportion of the particles with a diameter above about 4.0 µm did not pass.

The high relative and standard selectivities show that coarse microparticulates have been retained by the advanced particulate media in significantly greater proportion than the fine microparticulates, thereby achieving the precise and selective separation desired.

Example 2
Advanced Particulate Media Prepared by Sieving Between 100 and 120 Mesh Sieves In this example, 1 L of an aqueous microparticulate slurry containing a population of microspherical grains (Potter's Microspheres) was prepared by slurrying 0.3 grams of 3–4 µm microspheres, 0.2 grams each of 5–6 µm microspheres, 6–8 µm microspheres, and 8–10 µm microspheres in sufficient deionized water to result in a final volume of 1 L. The aqueous microparticulate slurry of the example had a particle size distribution described by having a $D_{50(f)}$ of 4.633, and $D_{90(f)}$ of 8.773, yielding a feed microparticulate spread, f, of 9.66.

An advanced particulate media was prepared by sieving an acid washed flux calcined diatomite filter aid (CELITE 545; Celite Corporation, Lompoc, Calif.). First, the particulate was placed on a 100 mesh (150 µm nominal sieve opening) sieve, shaken through the sieve, and the coarse particles remaining on the sieve were discarded. The remaining particles were shaken over a 120 mesh (125 µm nominal sieve opening) sieve, with particles passing through the sieve discarded. The entire sieving sequence was then repeated using the media that was retained on the 120 mesh sieve, using a stream of water to further improve the media index by rinsing the media free of fines. The media was then dried in air at 1100 C for a minimum of 2 hours. A sufficient quantity of filter aid was screened to yield approximately 50 grams of media. The advanced particulate media of the example had a particle size distribution described by having a $D_{10(m)}$ of 81.69, $D_{50(m)}$ of 127.4, and $D_{90(m)}$ of 184.7, yielding a media index of 1.2.

A 1.5 cm bed of the advanced particulate media was placed in a stainless steel filtration funnel of 37 mm diameter, supported on a 325 mesh (45 µm) stainless steel septum, and approximately 300 mL of aqueous microparticulate slurry was introduced to the bed using gravity flow. The aqueous microparticulate suspension passing through the bed of the advanced particulate media had a particle size distribution described by having a $D_{50(p)}$ of 3.503 and $D_{90(p)}$ of 6.352, yielding a passing microparticulate spread of 14.04. The relative selectivity of this example is 1.45, and the standard selectivity is calculated to be 4.78.

Figure 3:
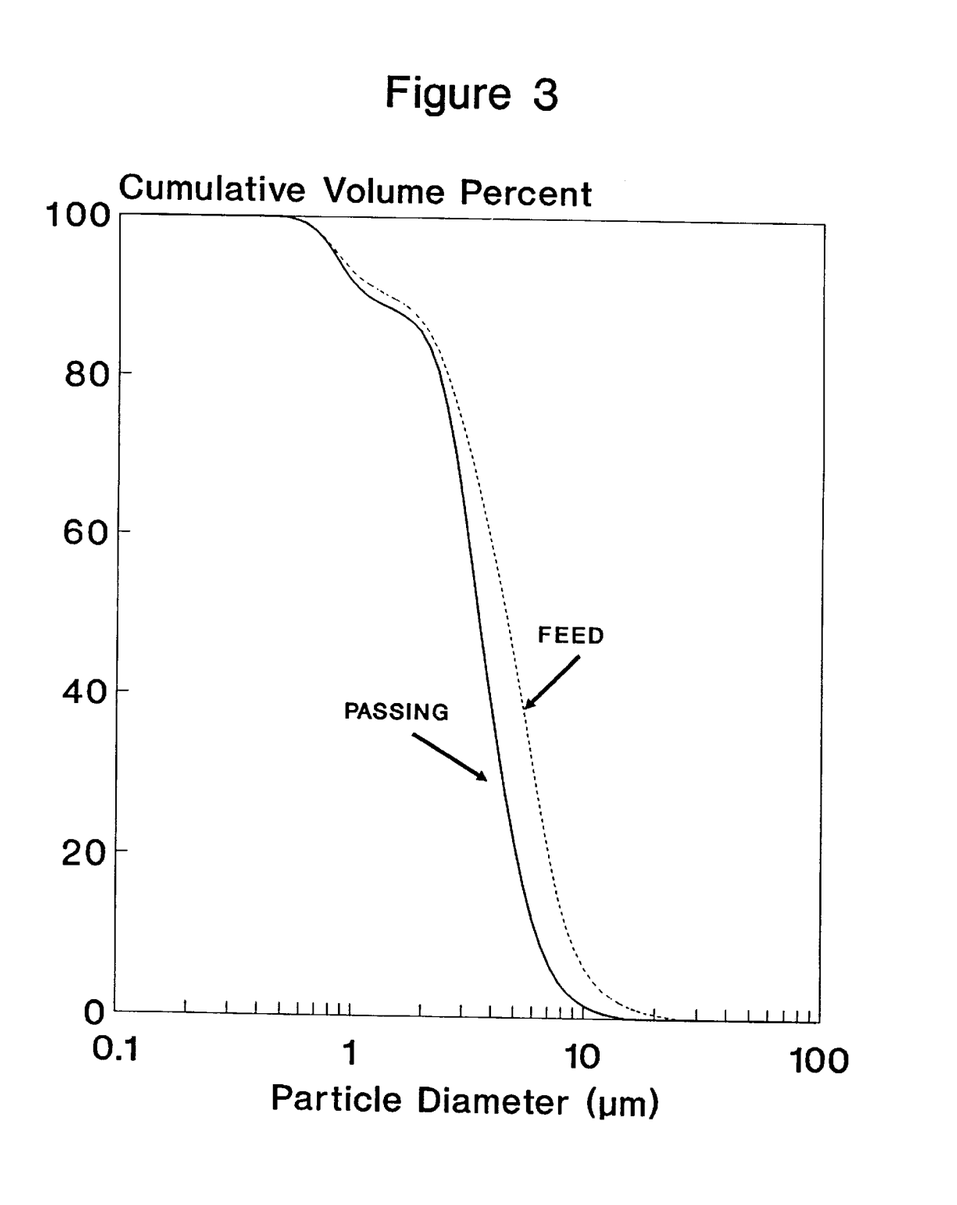
FIG. 3 is a graph depicting the particle size distribution, as cumulative volume percent versus particle diameter, for the feed particulate suspension and the passing microparticulate suspension of Example 2.

The results of this example are shown graphically in FIG. 3. The vast majority of microparticles with a diameter below about 2.0 µm were passed, while the proportion of the particles with a diameter above about 4.0 µm was substantially reduced.

Once again, the high relative and standard selectivities show that coarse microparticulates have been retained by the advanced particulate media in significantly greater proportion than the fine microparticulates, thereby achieving the precise and selective separation desired.

Example 3
Advanced Particulate Media Prepared by Sieving Between 200 and 230 Mesh Sieves, Followed by Modifications to Enhance the Selective Separation of White Blood Cells from Red Blood Cells In this example, an advanced particulate media was prepared by the following method. An acid washed flux calcined diatomite filter aid (Celite® 545; Celite Corporation, Lompoc, Calif.) was sieved using an Air Jet Alpine Particle Separator (Micron Powder Systems, Summit, N.J.), first collecting the particles passing through a 150 mesh (106 µm nominal sieve opening) sieve, and discarding the coarse oversize particles. The particles passing through the 150 mesh sieve were then placed on a 230 mesh (63 µm nominal sieve opening) sieve. The particles retained on the sieve were then collected, and the fine undersize particles were discarded.

The retained particles were then suspended in water, charged to a 230 mesh sieve mounted on a vibrating ring, and flushed with sufficient deionized water to clear any remaining undersize particles. The particles retained on the screen were then transferred to a 200 mesh (75 µm nominal sieve opening) sieve placed over a 230 mesh sieve, both mounted on a vibrating ring, and again flushed with deionized water. Particles retained on the 200 mesh sieve were discarded, and those retained on the 230 mesh sieve were collected.

A 50 gram quantity of the collected particles were placed in a 500 mL conical flask, to which 200 mL of 0.1 M sodium acetate (i.e., $CH_3COONa$) buffer at pH 5.5 were added. The contents were sonicated and deaerated under vacuum to remove any air trapped in the intricate and porous structures unique to the diatomite particles. To the flask were added 20 mL of 3-glycidoxypropyltrimethoxysilane (i.e., $C_9H_{20}O_5Si$), the flask was capped, and the contents shaken in a water bath at 90° C. (±0.5° C.) for 5 hours. In this step, terminal groups at the particle surface were converted from silanol (i.e., $\equiv$Si—OH) groups to epoxide groups (i.e., —(CH)O($CH_2$)).

The particles were then transferred to a Buchner funnel fitted with Whatman No. 42 filter paper, and thoroughly rinsed with deionized water, followed by washing with an aqueous dilute sulfuric acid (i.e., $H_2SO_4$) solution of pH 3.0. The filtered particles were then transferred to a 1 L conical flask containing an aqueous dilute sulfuric acid solution of pH 3.0. The contents were heated at reflux temperature for 1 hour to hydrolyze the terminal groups from epoxide groups to diol groups (i.e., —CH(OH)—$CH_2$(OH)). The contents were then transferred to a Buchner funnel fitted with Whatman No. 42 filter paper, thoroughly washed with deionized water, with methanol (i.e., $CH_3OH$), and dried in air for 16 hours at 70° C.

The particles were then suspended in 500 mL of 3% (v/v) hydrogen peroxide (i.e., $H_2O_2$) and stirred in a water bath at 90° C. for one hour. The highly hydrophilic particles containing peroxidized diol functional groups were transferred to a Buchner funnel fitted with Whatman No. 42 filter paper, thoroughly washed with deionized water, with methanol, and dried in air for 16 hours at 70° C., resulting in the desired advanced particulate media.

The advanced particulate media of this example had a particle size distribution described by having a $D_{10(m)}$ of 52.19, $D_{50(m)}$ of 74.46, and $D_{90(m)}$ of 122.5, yielding a media index of 1.1.

The advanced particulate media of this example was then used to effect the selective separation of red blood cells from white blood cells by placing 30 grams in a filter made of acrylic plastic, a substance less hydrophilic than the advanced particulate media so as to ensure the flow of blood through the media. The filter element was fitted with tubing adapters so that blood from could readily flow by gravity to the filter element through standard tubing fitted to a standard blood bag. The advanced particulate media was covered with a plastic sieve (Spectra/Mesh; 53 μm nominal sieve opening; obtained from Spectrum, Houston, Tex.) sealed at the top of the filter element from so as to evenly disperse blood over the surface of the advanced particulate media. The advanced particulate media was supported on a plastic sieve (Spectra/Mesh; 41 μm nominal sieve opening; obtained from Spectrum, Houston, Tex.) that was sealed to the base of the filter element, to prevent particles of media from entering the discharge of blood product.

The advanced particulate media was primed with approximately 200 mL of isotonic saline solution (i.e., 0.9% NaCl, Baxter Healthcare Corporation), followed by one unit (i.e., approximately 300 mL) of Type O positive red blood cell concentrate that was collected from a donor on the previous day. The red blood cell concentrate contained $6.94 \times 10^9$ red blood cells per milliliter, and $1.3 \times 10^6$ white blood cells per milliliter, as measured by a Baker 9000 Automated Cell Counter instrument.

The saline priming fraction was discarded, and the red blood cell product was collected until the unit red blood cell concentrate bag was emptied, for a total time of 28 minutes and 10 seconds. In the collected red blood cell product, the average concentration of red blood cells was $6.92 \times 10^9$ red blood cells per milliliter, while the white blood cell concentration was selectively reduced to $6.1 \times 10^3$ white blood cells per milliliter. The white blood cell concentration was below the detection limit of the Baker instrument, and was instead determined by manual optical microscopy using the Nageotte method. For reference purposes, the hematocrit of the red blood cell concentrate was 56.6%, while the average hematocrit of the red blood cell product remained virtually identical at 56.4%.

The results of this example show that the smaller red blood cells were selectively permitted to pass through the advanced particulate media, about 99.7% of them, while larger white blood cells were selectively restricted from passing through the advanced particulate media, with less than 0.5% passing. Thus, red blood cells were selectively passed through the media over white blood cells at a ratio of about 200:1. Thus, the advanced particulate media of this example achieved the precise and selective separation desired.

E. References

The disclosures of the publications, patents, and published patent specifications referenced below are hereby incorporated by reference into the present disclosure to more fully describe the state of the art to which this invention pertains.

Abe, T. (1984), U.S. Pat. No. 4,425,237.
Adler, S. (1975), U.S. Pat. No. 3,929,646.
Bear, J. (1988), *Dynamics of Fluids in Porous Media* (New York: Dover Publications, Inc.), 161–176.
Calenoff, E. (1987), U.S. Pat. No. 4,675,286.
Carman, P. (1937), *Trans. Institution of Chem. Eng.;* 150–166.
Carroll, R., et al. (1989), U.S. Pat. No. 4,816,168.
Carroll, R., et al. (1987), U.S. Pat. No. 4,640,785.
Columbus, R. (1977), U.S. Pat. 4,050,451.
Delaage, M., et al. (1984), French Patent 8415434.
Delaage, M., et al (1992), U.S. Pat. No. 5,116,724.
Delaage, M., et al. (1993), U.S. Pat. No. 5,246,829.
Dorn, A. (1990a), U.S. Pat. No. 4,927,749.
Dorn, A. (1990b), U.S. Pat. No. 4,927,750.
Goffe, R., et al. (1993), U.S. Pat. No. 5,240,856.
Hall, S., et al. (1987), U.S. Pat. No. 4,698,311.
Heertjes, P., et al. (1949), *Recueil,* 68; 361–383.
Heertjes, P., et al. (1966), in *Solid-Liquid Separation* (London: Her Majesty's Stationery Office); 37–43.
Hellem, A. (1971), *Scand. J. Haemat.* 8:180–182.
Hermanson, G., et al. (1992), Immobilized Affinity Ligand Techniques (San Diego: Academic Press Inc.).
Ishida, M., et al. (1988), Japanese Patent 63-282544.
Ishida, M., et al. (1991), U.S. Pat. No. 5,030,361.
Ishida, M., et al. (1993), U.S. Pat. No. 5,227,066.
Junqueira, L., et al. (1975), *Basic Histology* (Los Altos, Calif.: Lange Medical Publications); 223–239.
Kiefer, J. (1991), *Brauwelt International,* IV/1991; 300–309.
Kolobow, T., et al. (1982), U.S. Pat. No. 4,356,958.
Kolobow, T., et al. (1983), U.S. Pat. No. 4,419,089.
Kortwright, K., et al. (1988), U.S. Pat. No. 4,752,563.
Latham, Jr., A. (1981a), U.S. Pat. No. 4,285,464.
Latham, Jr., A. (1981b), U.S. Pat. No. 4,303,193.
Lloyd, P., et al. (1975), *Filtration & Separation,* May/June 1975; 246–253.
Luderer, A., et al. (1991), U.S. Pat. No. 5,053,134.
Luderer, A., et al. (1990), U.S. Pat. No. 4,917,801.
Marinaccio, P., et al. (1990), U.S. Pat. No. 4,915,839.
Miltenyi, S. (1995a), U.S. Pat. No. 5,385,707.
Miltenyi, S. (1995b), U.S. Pat. No. 5,411,863.
Norden H., et al. (1994), *Separation Science and Technology* 29:10; 1319–1334
Pall, D., et al. (1995a), U.S. Pat. No. 5,445,736.
Pall, D., et al. (1995b), U.S. Pat. No. 5,339,268.
Pall, D., et al. (1994a), U.S. Pat. No. 5,344,561.
Pall, D., et al. (1994b), U.S. Pat. No. 5,360,545.
Pall, D., et al. (1994c), U.S. Pat. No. 5,316,674.
Pall, D., et al. (1993a), U.S. Pat. No. 5,258,126.
Pall, D., et al. (1993b), U.S. Pat. No. 5,229,012.
Pall, D., et al. (1993c), U.S. Pat. No. 5,217,627.
Pall, D., et al. (1992a), U.S. Pat. No. 5,152,905.
Pall, D., et al. (1992b), U.S. Pat. No. 5,100,564.
Pall, D., et al. (1990a), U.S. Pat. No. 4,925,572.
Pall, D., et al. (1990b), U.S. Pat. No. 4,923,620.
Pascale, F., et al. (1994), U.S. Pat. No. 5,302,299.
Persidsky, M. (1981), U.S. Pat. No. 4,269,718.
Pierce, Z., et al. (1981), U.S. Pat. No. 4,258,001.
Pitney, W., et al. (1967), *J. clin. Path.* 20:710–716.
Powers, E. (1988), U.S. Pat. No. 4,767,396.
Ruth, B. (1946), *Industrial and Engineering Chemistry,* 38:6; 564–571.
Saunders, A., et al. (1995), U.S. Pat. No. 5,432,054.
Smith, W. (1990), U.S. Pat. No. 4,957,638.

Smith, W. (1989), U.S. Pat. No. 4,844,818.

Sperry, D. (1916), *Metallurgical and Chemical Eng.* XV:4; 198–203.

Tarleton, E., et al. (1994), Filtration and Separation; June 1994; 393–397.

Teng, N., et al. (1994), U.S. Pat. No. 5,275,933.

Teng, N., et al. (1995), U.S. Pat. No. 5,437,987.

Terasaki, P., et al. (1989), U.S. Pat. No. 4,797,475.

Tianshou, C. (1988), *Materials Science and Engineering,* A105/106, 571–576.

Tiller, F., et al. (1953), *Chemical Engineering Progress,* 49:9; 467–479.

Tiller, F., et al. (1962), *A.I.Ch.E. Journal,* 8:4; 445–449.

Tiller, F., et al. (1964), *A.I.Ch.E. Journal,* 10:1; 61–67.

Vorpahl, J. (1994), U.S. Pat. No. 5,279,936.

Yen, S., et al. (1980), U.S. Pat. No. 4,219,411.

What is claimed is:

1. A method of selectively mechanically separating microparticles according to microparticle size from a suspension of microparticles in a fluid, said microparticles having a size in the range of 0.1 μm to 500 μm, the method comprising:

(a) providing on a support a particulate media having a standard selectivity equal to or greater than 4.0, selected from the group consisting of:

particulate media with a median particle diameter equal to or greater than 20 μm up to 35 μm with a media index equal to or greater than 0.60;

particulate media with a median particle diameter greater than 35 μm up to 180 μm with a media index equal to or greater than 1.0;

particulate media with a median particle diameter greater than 180 μm up to 500 μm with a media index equal to or greater than 2.0; and particulate media with a median particle diameter greater than 500 μm up to 1400 μm with a media index equal to or greater than 3.0; and (b) passing said microparticulate suspension through said particulate media, thereby effecting selective mechanical separation according to microparticle size.

2. The method of claim 1, wherein said particulate media comprises rigid particles.

3. The method of claim 2, wherein said rigid particles comprise minerals or products of mineral origin.

4. The method of claim 2, wherein said rigid particles comprise a polymeric material.

5. The method of claim 2, wherein said rigid particles comprise inorganic salts, metals, or glasses.

6. The method of claim 1, wherein said particulate media comprises compressible particles.

7. The method of claim 6, wherein said compressible particles comprise a polymeric material.

8. The method of claim 1, wherein said microparticulate suspension comprises rigid microparticles.

9. The method of claim 1, wherein said microparticulate suspension comprises compressible microparticles.

10. The method of claim 1, wherein said microparticulate suspension comprises cells.

11. The method of claim 10, wherein said cells are selected from the group consisting of white blood cells, red blood cells, and platelets.

12. The method of claim 10, wherein said cells are selected from the group consisting of white blood cells and red blood cells.

13. The method of claim 10, wherein said cells are selected from the group consisting of white blood cells and platelets.

14. The method of claim 10, wherein said fluid is of biological origin.

15. The method of claim 10, wherein said fluid is blood.

16. The method of claim 10, wherein said fluid is derived from blood.

17. The method of claim 1, wherein the passage of said microparticulate suspension through said particulate medium is aided by gravity.

18. The method of claim 1, wherein the passage of said microparticulate suspension through said particulate medium is aided by the application of a positive pressure in advance of said support.

19. The method of claim 1, wherein the passage of said microparticulate suspension through said particulate medium is aided by the application of a negative pressure beyond said support.

20. The method of claim 1, wherein additional of said particulate media is added to said microparticulate suspension, prior to step b).

21. The method of claim 1, wherein said particulate media is incorporated into a composition in a form selected from the group consisting of a pad, a sheet, and a cartridge.

22. The method of claim 1, wherein said particulate media is contained within a filter that is less hydrophilic than the particulate media.

23. The method of claim 1, wherein microparticles retained by said particulate media are collected, harvested, concentrated, or retrieved.

24. The method of claim 23, wherein said microparticles retained comprise rigid microparticles.

25. The method of claim 23, wherein said microparticles retained comprise compressible microparticles.

26. The method of claim 23, wherein said microparticles retained comprise cells.

27. The method of claim 23, wherein said microparticles retained comprise white blood cells.

28. The method of claim 1, wherein the suspension of microparticles comprises an industrial filler material.

29. The method of claim 1, wherein the suspension of microparticles comprises a material selected from the group consisting of diatomite, silica, and calcium carbonate.

30. The method of claim 1, wherein the suspension of microparticles comprises a pigment material.

31. The method of claim 30, wherein the suspension of microparticles comprises titanium dioxide.

32. The method of claim 1, wherein the particulate media has a median particle diameter equal to or greater than 20 μm up to 35 μm and a media index equal to or greater than 0.60.

33. The method of claim 1, wherein the particulate media has a median particle diameter greater than 35 μm up to 180 μm and a media index equal to or greater than 1.0.

34. The method of claim 1, wherein the particulate media has a median particle diameter greater than 180 μm up to 500 μm and a media index equal to or greater than 2.0.

35. The method of claim 1, wherein particulate media has a median particle diameter greater than 500 μm up to 1400 μm and a media index equal to or greater than 3.0.

* * * * *